(12) United States Patent
Bradley (10) Patent No.: US 10,357,839 B1
(45) Date of Patent: Jul. 23, 2019

(54) METHOD FOR ELECTROCHEMICAL MACHINING USING SYMPATHETIC WAVEFORM INTERACTIONS

(71) Applicant: The United States of America as Represented by the Secretary of the Army, Washington, DC (US)

(72) Inventor: Curtis Bradley, Latham, NY (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 269 days.

(21) Appl. No.: 15/290,258

(22) Filed: Oct. 11, 2016

Related U.S. Application Data (60) Provisional application No. 62/238,940, filed on Oct. 8, 2015, provisional application No. 62/238,951, filed on Oct. 8, 2015, provisional application No. 62/238,959, filed on Oct. 8, 2015.

(51) Int. Cl.
*B23H 3/02* (2006.01)
(52) U.S. Cl.
CPC ..................... *B23H 3/02* (2013.01)
(58) Field of Classification Search
None
See application file for complete search history.

(56) References Cited

U.S. PATENT DOCUMENTS

| | | | |
|---|---|---|---|
| 3,616,346 A | 10/1971 | Inoue | |
| 3,710,067 A * | 1/1973 | Ullmann | B23H 7/38 219/69.13 |
| 5,833,835 A * | 11/1998 | Gimaev | B23H 3/02 205/645 |
| 6,315,885 B1 | 11/2001 | Hocheng | |
| 6,402,931 B1 * | 6/2002 | Zhou | B23H 3/02 204/DIG. 9 |
| 6,835,299 B1 | 12/2004 | Tchugunov | |

(Continued)

OTHER PUBLICATIONS

Aaboudi, Magnetic Field Effects on Mass Transport, Journal of the Electrochemical Society, Jun. 1990, 1796-1804, vol. 137, Electrochemical Society, Pennington, NJ, US.

(Continued)

*Primary Examiner* — Nicholas A Smith
(74) *Attorney, Agent, or Firm* — John P. DiScala (57) ABSTRACT

A system and method for combining the effects of magnetic field waveforms, ultrasonic motion and pulsed electric field waveforms in an electrolytic cell creates a sympathetic interaction among the three waveforms that improves the electrochemical machining process. Precisely controlling the coupled effects of simultaneously applying at least two of the three waveforms to the electrochemical cell improves the metal removal rate of the process and the surface finish of the resulting piece. The coupled effects are termed a sympathetic interaction as they can be damped or amplified by modifying the phasing, frequency, orientation or amplitude of the waveforms. In an electrochemical machining process aided by an external magnetic field and periodic ultrasonic relative motion between the tool and working piece, improvements are realized by utilizing for at least two of the magnetic field waveform, electric waveform and ultrasonic waveform, a common frequency and a chosen phase lag between the two waveforms.

18 Claims, 7 Drawing Sheets

(56) References Cited

U.S. PATENT DOCUMENTS

| | | | |
|---|---|---|---|
| 7,569,133 B2 | 8/2009 | Kortvelyessy | |
| 9,006,147 B2 | 4/2015 | Taylor | |
| 2012/0181179 A1* | 7/2012 | Zaytsev | B23H 3/02 205/81 |

OTHER PUBLICATIONS

Ayyappan, Electrochemical Machining of 20MnCr5 Alloy Steel with Magnetic Flux Assisted Vibrating Tool, Proceedings of the Institution of Mechanical Engineers, Part C: Journal of Mechanical Engineering Science, Dec. 15, 2015, 1-10, Institution of Mechanical Engineers, London, UK.
Fan, The Mechanism of Improving Machining Accuracy of ECM by Magnetic Field, Journal of Materials Processing Technology, 2004, 409-413, vol. 149, Elsevier B.V., Amsterdam, NL.
Fang, Magnetic Electrochemical Finishing Machining, Journal of Materials Processing Technology, 2002, 283-287, vol. 129, Elsevier B.V., Amsterdam, NL.
Inman, Niobium Electropolishing in an Aqueous, Non-Viscous HF-Free Electrolyte: A New Polishing Mechanism, Proceedings of SRF 2011, 377-380, Chicago, IL, US.
Jafferson, Effects of Ultrasonic Vibration and Magnetic Field in Micro-EDM Milling of Nonmagnetic Material, Materials and Manufacturing Processes, 2014, 357-363, vol. 29, Taylor and Francis Group, Abingdon UK.
Mathew, Modeling and Fabrication of Micro Tools by Pulsed Electrochemical Machining, Journal of Materials Processing Technology, 2012, 1567-1572, vol. 212, Elsevier B.V., Amsterdam, NL.
Mukherjee, Effect of Valency on Material Removal Rate in Electrochemical Machining of Aluminum, Journal of Materials Processing Technology, 2008, 398-401, vol. 202, Elsevier B.V., Amsterdam, NL.

PA, A Super Surface Finish Module by Simultaneous Influences From Electromagnetic Force and Ultrasonic Vibrations, Materials and Manufacturing Processes, 2010, 288-292, vol. 25, Taylor and Francis Group, Abingdon, UK.
PA, Super Finishing with Ultrasonic and Magnetic Assistance in Electrochemical Micro-Machining, 2009, 6022-6027, vol. 54, Elsevier B.V., Amsterdam, NL.
PA, Turning-Form Electrode in Ultrasonic-Aided Electrochemical Finishing, Journal of Achievements in Materials and Manufacturing Engineering, 2007, 77-80, vol. 21 Issue 2, JAMME, Gliwice, PL.
Park, Pulse Electrochemical Polishing for Microrecesses Based on a Coulostatic Analysis, International Journal for Advanced Manufacturing Technology, Feb. 22, 2008, 742-748, vol. 40, Springer-Verlag, London UK.
Ruszaj, Some Aspects of the Electrochemical Machining Process Supported by Electrode Ultrasonic Vibrations Optimization, Proceedings of the Institution of Mechanical Engineers, 2003, 1365-1371, vol. 217 Part B, Institution of Mechanical Engineers, Krakow PL.
Surway, The Particle Nature of Matter, 2005, 108-109, Thomson Learning Inc., New York, NY US.
Skoczypiec, Research on Ultrasonically Assisted Electrochemical Machining Process, International Journal for Advanced Manufacturing Technology, Jun. 26, 2010, 565-574, vol. 52, Springer-Verlag, London UK.
Spieser, Design of a Pulse Power Supply Unit for Micro-ECM, International Journal for Advanced Manufacturing Technology, Dec. 10, 2014, 537-547, vol. 78, Springer-Verlag, London UK.
Stoltz, Inhibition of Corrosion Fatigue in 7075 Aluminum Alloys, Corrosion Journal, 1973, 13-17, vol. 29(1), NACE International, Houston, TX, US.
Weber, Modeling of the Material/Electrolyte Interface and the Electrical Current Generated During the Pulse Electrochemical Machining of Grey Cast Iron, Proceedings of the 2013 COMSOL Conference, 2013, COMSOL Inc., Burlington, MA US.

* cited by examiner

METHOD FOR ELECTROCHEMICAL MACHINING USING SYMPATHETIC WAVEFORM INTERACTIONS

RELATED APPLICATIONS

This application claims the benefit of priority to provisional application No. 62/238,940 filed Oct. 8, 2015, and further claims the benefit of priority to provisional application No. 62/238,951 filed Oct. 8, 2015, and further claims the benefit of priority to provisional application No. 62/238,959 filed Oct. 8, 2015, the disclosures of which are incorporated herein by reference in its entirety.

RIGHTS OF THE GOVERNMENT

The inventions described herein may be manufactured and used by or for the United States Government for government purposes without payment of any royalties.

FIELD OF INVENTION

This application relates generally to the field of electrochemical machining and more specifically to electrochemical machining using the combination of magnetic fields and ultrasonic actuation in an electrolytic cell.

BACKGROUND OF THE INVENTION

Electro chemical machining (ECM) is a non-mechanical process for removing metal at an atomic level in an electrolytic cell. ECM is useful for machining hard, high strength, wear resistance metals that are difficult and expensive to shape using traditional methods. In addition, ECM is also useful to machine irregular shapes such as dies and molds which do not respond well to traditional machining methods.

The electrolytic cell in an ECM process consists of a tool electrode (cathode) and a work piece electrode (anode) that are separated by an interelectrode gap (IEG) through which an electrolytic solution (e.g. NaCl or $NaO_3$) flows. In conventional ECM processes, the tool electrode is advanced towards the work piece electrode while an electric current passes through the electrolyte flowing through the IEG. This causes dissolution of the surface metal ions from the work piece into the electrolyte solution. Over time, accumulation of waste material, heat and exhaustion of the electrolytes in the IEG leads to unfavorable kinetics and reaction stoichiometry in the electrolytic cell. To remedy this, the electrolytic solution is flowed through the cell to remove the remove waste product and heat away from the IEG while supplying unreactive ions to maintain the electrically conductive path.

Additionally, a variety of technologies may be incorporated to improve the ECM process. One such method is to vary the current through the IEG. Pulsed ECM (PECM) processes employ a pulsed direct current (DC) electric field across the IEG to improve surface finish.

Ultrasonic actuation of the tool or work piece may also be incorporated to improve the ECM process. By speeding the metal hydroxide byproduct out the inter-electrode gap through mixing action which helps overcome the usual mass transport limitations the material removal rate and current efficiency of the process is improved. Additionally, cavitation from ultrasonic motion can inhibit the formation of the passivation layer which will increase the material removal rate. However, ultrasonic technology is typically viewed as a bulk treatment for an electrochemical reaction adding agitation or cavitation to a fluid involved in the chemical reaction.

Magnetic fields introduced in the electrochemical cell improve the conditions within the cell as well. When augmenting electrochemical cells, magnetic fields are typically generated from permanent magnets with changes in the magnetic field created using rotary motion of the magnets or work piece. When electromagnets are employed they typically function using direct current (DC) or at very low frequency alternating current (AC).

While it is currently known to combine two or more of these technologies to further improve the machining process, these efforts have primarily been focused on combining the individual effects without regard for any synergistic effects which may be realized. Accordingly, there is a need for an improved system and method for electrochemical machining.

SUMMARY OF THE INVENTION

The present invention relates to a system and method for improving an electrochemical machining process. According to a first aspect, An electrochemical machining technique comprises the steps of interposing an electrolyte solution comprising ions through an interelectrode gap wherein the surface of a metallic work piece and an electrically conductive tool is exposed to the electrolyte solution in the interelectrode gap and generating a force on the ions in the electrolyte solution by simultaneously applying an electric field defined by an electric field waveform across the interelectrode gap, an external magnetic field defined by a magnetic field waveform to the electrolyte solution, and a relative ultrasonic actuation defined by an ultrasonic waveform to the electrically conductive tool. At least two of the electric field waveform, the magnetic field waveform and the ultrasonic waveform are coupled in a predetermined sympathetic interaction.

BRIEF DESCRIPTION OF THE DRAWINGS

Further features and advantages of the present invention may be understood from the drawings.

DETAILED DESCRIPTION

Provided herein is a system and method for combining the effects of an external magnetic field, ultrasonic motion and a pulsed electric field in an electrolytic cell to create sympathetic interaction among the waveforms to improve the electrochemical machining process. Precisely coordinating the coupled effects of simultaneously applying at least two of the three technologies, defined by an electric field waveform, a magnetic field waveform and an ultrasonic waveform, to the electrochemical cell improves the metal removal rate of the process and the surface finish of the resulting piece. The coupled effects are termed a sympathetic interaction as they can be damped or amplified by modifying the phasing, frequency, orientation or amplitude of the waveforms. In an electrochemical machining process aided by an external magnetic field and periodic ultrasonic relative motion between the tool and working piece, improvements are realized by utilizing for at least two of the magnetic field waveform, electric field waveform and ultrasonic waveform, a common frequency and a chosen phase lag between at least the two waveforms.

Combining these fields in a controlled manner to create sympathetic interactions allow for more stationary ion motion patterns and increases the likelihood of beneficial effects because the ions have the opportunity to trace a more focused pattern. The combination of fields to create sympathetic interactions also allows ions to be coerced in a specific arbitrary net direction based on the two field phases. A stationary ion pattern is one where ion motion tends to travel repeatedly along a similar path. By circulating ions along a path many of the positive effects of an oblique path will have more opportunities to occur.

In tests performed, it was discovered that by driving the pulsed electric field waveform, periodic ultrasonic motion and a pulsed magnetic field at the same frequency and by controlling the ultrasonic motion waveform to lag the pulsed electric field waveform by a predetermined fixed phase, there was a marginal improvement in the material removal rate (MRR) and a significant improvement in the surface finish of the workpiece. In one particular embodiment as described in more detail below, MRR was found to increase at predetermined fixed phase lags of −90, 0 and 180 degrees. The peak MRR was found to occur when the ultrasonic waveform lagged the pulsed electric field waveform by 0 degrees (i.e. their periodic peaks line up). In the same embodiment, the surface roughness was found to decrease when the predetermined fixed phase lag was −90, 0 and 90 degrees with the peak improvement at 90 degrees.

It has also been discovered that material removal rate (MRR) is significantly increased by driving the pulsed electric field waveform, periodic ultrasonic motion and a pulsed magnetic field at the same frequency and by controlling the pulsed magnetic field to lag the ultrasonic motion waveform by a predetermined fixed phase. In one particular embodiment as described in more detail below, MRR was found to increase at predetermined fixed phase lags of −90, 0, 90 and 180 degrees. The peak MRR was found to occur when the ultrasonic waveform lagged the pulsed electric field waveform by 180 degrees.

By driving the pulsed electric field waveform, periodic ultrasonic motion and a pulsed magnetic field at the same frequency and by controlling the pulsed magnetic field to lag the pulsed electric field waveform by a predetermined fixed phase the material removal rate (MRR) is increased and the surface roughness is decreased. In one particular embodiment as described in more detail below, MRR was found to increase at a predetermined fixed phase lag of 0 degrees. In the same embodiment, the peak surface roughness was found to decrease when the predetermined fixed phase lag was −90 and 0 degrees with the peak decrease at 0 degrees.

Combining all three assistive waveforms at specific phasing yields the best surface roughness of any assisted ECM process. In tests performed, the best combined performance was achieved when the ultrasonic motion waveform lagged the pulsed electric field at 0 degrees and the pulsed magnetic field lagged the ultrasonic waveform by −90 degrees. This triad assisted process had the best surface quality but did not have the highest peak or average current while sill improving the MRR. This specific phasing raised the current at the end of the anodic pulse higher than the initial spike associated with the electrical double layer (EDL) charging that starts the anodic pulse. This results from the combination of the magnetically induced current peak with the minimum IEG timed with the electric field anodic pulse end.

Figure 1:
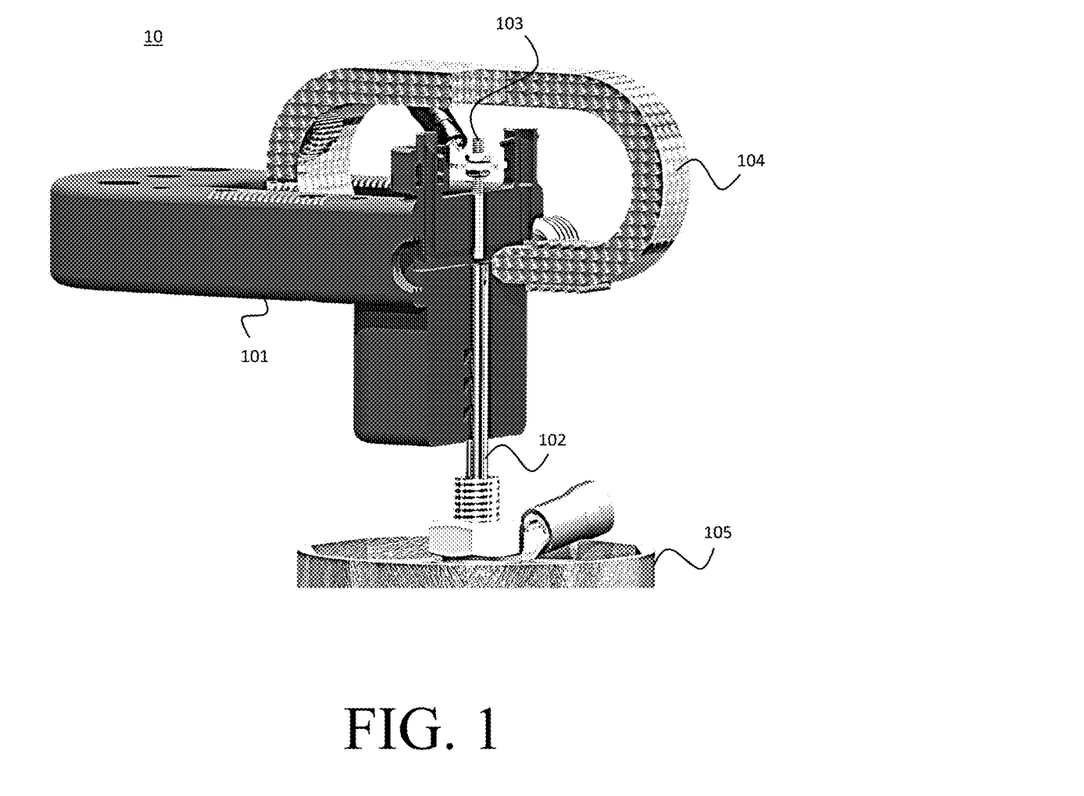
FIG. 1 shows a system for combining the effects of magnetic field waveforms, ultrasonic motion and pulsed electric field waveforms in an electrolytic cell to create a sympathetic interaction, in accordance with one illustrative embodiment of the invention.

FIG. 1 shows a system for combining the effects of magnetic field waveforms, ultrasonic motion and pulsed electric field waveforms in an electrolytic cell to create a sympathetic interaction, in accordance with one illustrative embodiment of the invention. It will be appreciated by those skilled in the art that the system shown in FIG. 1 and described herein is a system for use in a laboratory setting to test and measure the effective results of the one or more sympathetic interactions described below. However, the system and methods described herein are not limited to this purpose. The system is illustrative only and similar systems may be employed for use in a machining facility to tool work pieces.

The system comprises a flow cell assembly 10 further comprising, a flow cell 101, a work piece (the anode) 102, a tool (the cathode) 103, and electric field generator, an electromagnet C-core 104, an ultrasonic transducer 105.

The electrochemical flow cell 101 wherein the reaction occurs is a rigid plastic structure printed using an Objet350 multi-material 3D printer available from Stratasys Ltd of Eden Prairie, Minn. This additive manufacturing technology allowed several custom elastomer, low friction, and low pressure rod seals to be printed within the flow cell 101. Additionally the rigid plastic structure was printed with integral, contrasting color, distance markers for setting the permanent magnet fixtures in location.

Figure 2:
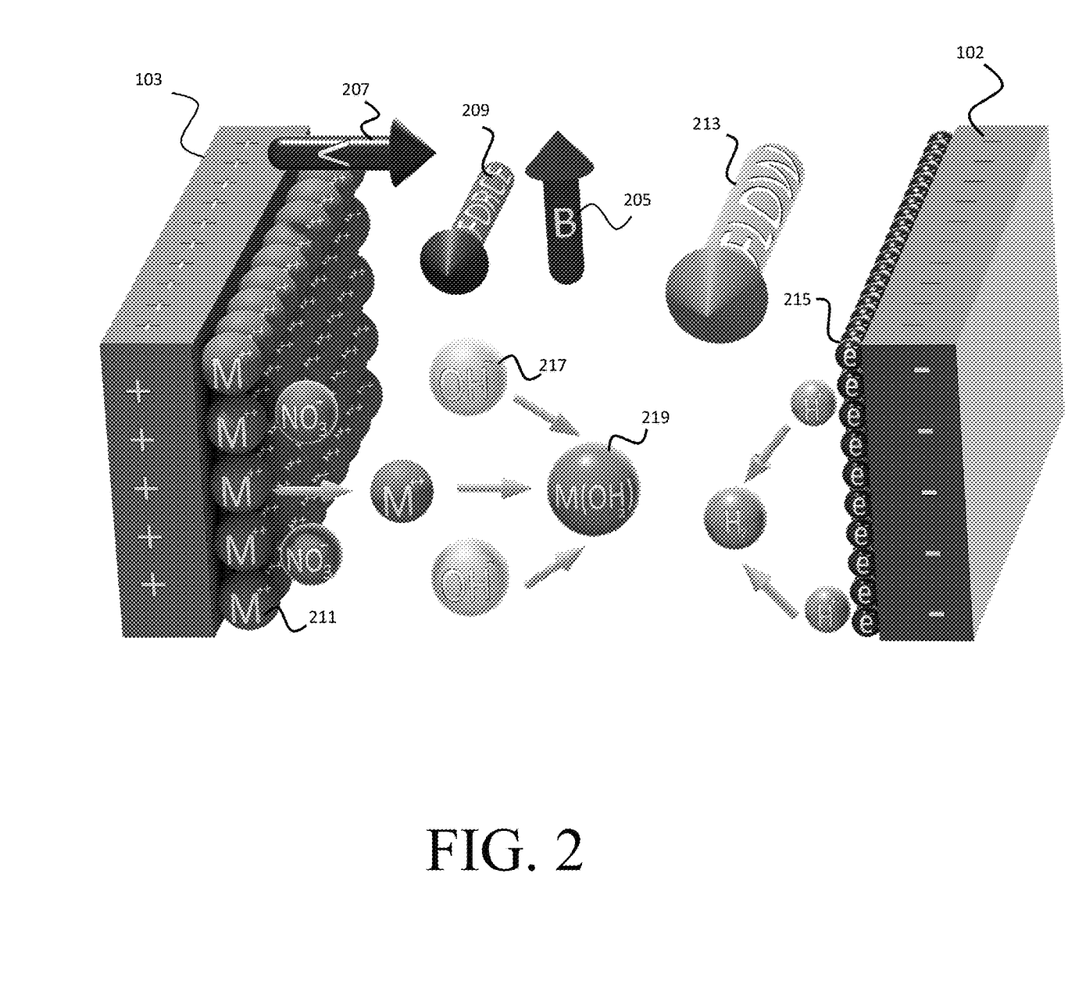
FIG. 2 illustrates an electrolytic cell of the type used in the system of FIG. 1, in accordance with one illustrative embodiment of the invention.

FIG. 2 is an illustration of an anodic dissolution cell used in electro-chemical machining, in accordance with an illustrative embodiment of the invention. An electric field is generated between the two charged electrodes, an anode 102 and a cathode 103. A magnetic field is represented by arrow 205 which points in the direction of the magnetic field. The motion of ultrasonic actuation is represented by arrow 207. In the embodiment shown in FIG. 2, the ultrasonic velocity and electric field are parallel to one another and both are orthogonal to the magnetic field. The resulting Lorentz force is generically represented by arrow 209, where the actual force would have a specific magnitude and direction unique to and centered on each ion.

Metal ions 211 form part of the EDL on the anode 102. Electrolyte flow through the machining gap between the anode 102 and the cathode 103 is represented by arrow 213. Electrons 215 form part of the cathode 103. A typical anodic dissolution reaction is illustrated in FIG. 2 showing a metal ion 211 combine with hydroxide molecules 217 to form metal hydroxide molecules 219.

The flow cell assembly 10 receives a flow of electrolyte into and out of the flow cell 101. For testing purposes, the system is designed to discharge the electrolyte after a single use to limit the possibility of metal hydroxides being deposited in the machining area. However, in a flow cell assembly 10 for use in a manufacturing line, the electrolyte may be filtered and re-used. Electrolyte is pumped using a gear pump with machining area pressure and flow controlled using the combination of pulse width modulated (PWM) pump control and a needle valve on the discharge side of the flow cell 101. The configuration allow the use of a higher pressure across the entire machining surface helping to reduce the size of the bubbles caused by gas evolution from over potential in a machining gap.

The flow cell 101 structure allows for minimum distance from the machining surface to the magnetic poles while simultaneously allowing ultrasonic actuation orthogonal to the maximum magnetic field vector directed from one magnet pole to the other. The electrolyte flow is orthogonal to both the magnetic field and ultrasonic actuation. The electric field directed from work piece 102 to tool 103 is parallel to ultrasonic actuation.

The electric field waveform is generated by the electric field generator. The electric field waveform varies from DC to an asymmetric bi-polar pulse. This is accomplished using an H-bridge composed of P-channel and N-channel metal-oxide semiconductor field-effect transistors (MOSFETs) combined with two precision bench power supplies. Unlike typical H-bridge configurations, this design separates the forward and reverse inputs which correspond to the anodic and cathodic electric field pulses respectively. Each bench top power supply can be set to a different voltage or current allowing an asymmetrical anodic and cathodic pulse. Bipolar pulsed ECM is commonly used to machine highly passivated metals like tungsten carbide or niobium. The cathodic electric field pulse is typically used to remove the oxide layer from passivated metals and expose the metal surface for ECM or electropolishing. Since the oxide layer forms periodically during machining the electric field must be pulsed repeatedly to continually machine the work piece 102.

Figure 3:
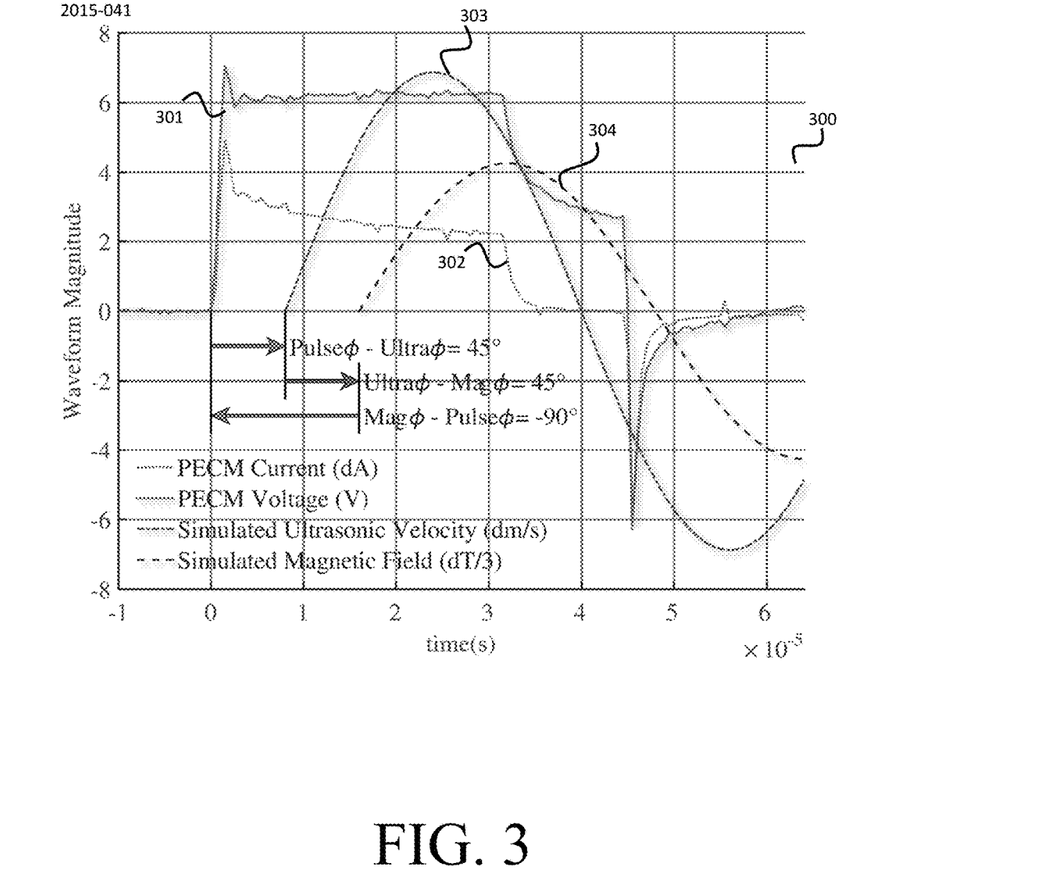
FIG. 3 illustrates the PECM voltage waveform across the electrodes, the current waveform flowing into the cathode, the magnetic field waveform and the ultrasonic motion waveform, in accordance with an illustrative embodiment of the invention.

FIG. 3 illustrates the PECM voltage waveform across the electrodes, the current waveform flowing into the cathode, the magnetic field waveform and the ultrasonic motion waveform, in accordance with one illustrative embodiment of the invention. For ECM processes in which sympathetic interactions were achieved by controlling the electric field waveform 301 and one or more of the magnetic field waveform 304 and the ultrasonic waveform 303, an electric field waveform 301, as represented by the waveform for the voltage across the electrodes, having an asymmetrical bi-polar electric pulse was generated. As shown in FIG. 3, the anodic duty cycle of the electric field waveform 301 is approximately 50% and the cathodic duty cycle is approximately 2% with a delay of 20% from the anodic pulse. For testing purposes, the rising edge anodic current pulse was set to be at a time zero when the phase shift of the electric field waveform 301 was at zero degrees. A ninety (90) degree shift in the phase of the electric field waveform 301 delays voltage across the cell 16 microseconds.

A DC-ECM waveform was generated to establish a baseline for testing purposes as well as for dual assisted ECM processes in which sympathetic interactions between ultrasonic actuation and magnetic field waveforms were induced.

Ultrasonic motion is generated using an ultrasonic transducer 105. For example the ultrasonic transducer 105 may be an Etrema CU18A magnetostrictive transducer 105, manufactured by Etrema Products, Inc. of Ames, Iowa, due to its widely variable frequency response. The transducer 105 is powered by one channel of a Crown XLS 2000 amplifier at 50 V. At this voltage the transducer 105 can be operated continuously without requiring additional cooling.

The ultrasonic waveform 303 is defined such that a positive work piece 102 velocity reduces the IEG. The position of the work-piece is defined by the following equation:

$$d_{tot} = d - A(\sin(2\Pi ft + \Phi + 90°)/2 + \frac{1}{2})$$

In the above equation, $d_{tot}$ represents the distance of the IEG, d is the maximum distance of the IEG, f is the frequency of the ultrasonic waveform 303 and $\Phi$ is the relative phase lag.

The electromagnet 104 is optimized for electric field intensity and high frequency operation. Hiperco 50 alloy was used to fabricate the electromagnet 104 for its very high magnetic permeability allowing high frequency operation at a high magnetic flux density. The alloy is manufactured using cold rolling for dimensional precision and then annealed to achieve the desired balance between mechanical and magnetic properties. This design required a full anneal in a dry H2 environment with the addition of a dielectric coating to minimize eddy currents and maximize magnetic properties.

Accordingly, using the system described above, each of the electric field waveform 301, ultrasonic waveform 303 and magnetic field waveform 304 may be controlled to generate sympathetic interactions within the electrochemical cell. The frequency, amplitude, phase shift and orientation of two or more of the waveforms may be selectively controlled to achieve certain results. As described below, in tests performed by the inventor, the frequency of at least two of the three waveforms was set constant to each other and the phase lag was controlled to achieve sympathetic interactions between the two.

Experimental Setup

To determine the optimal control parameters for achieving sympathetic interactions for all four scenarios (pulsed electric and ultrasonic, pulsed electric and pulsed magnetic, ultrasonic and pulsed magnetic, triad), experimental runs were conducted using the system shown in FIG. 1. All experimental runs were performed with NaNO3 electrolyte at 20% concentration and a flow rate of 125±20 ml/min with a back pressure of 6 psi and temperature of 210°±1° Celsius. The electrolyte was chosen to avoid additional corrosion of aluminum associated with the Cl+ ions from NaCl. The machining area of a 316 stainless steel tool cathode 103 was 2.25 mm2 with an acetyl insulating annulus. The initial IEG was 0.2 mm. The tool 103 and work pieces 102 were successively polished from to 12000 grit within a fixture to help maintain flatness. Machining time was kept to only 15 seconds to minimize changes in turbulence from start to finish. Electrochemical machining work pieces 102 were all 7075 aluminum alloy. All waveforms had a frequency of 15.625 kHz and oscilloscope data was sampled at 2 MHz. Additionally measured was the combined EDL capacitance of both the work piece 102 and tool 103 electrodes for a value of C of 180±0.16% nF with a series resistance, R, of 76Ω. The measurement was made using an Agilent 426 B LCR meter at IV and 10 KHz with electrolyte flowing at standard temperature and pressure in the flow cell 101.

To measure the effects of phasing between assistive waveforms (electric, magnetic and ultrasonic) the phase difference between each was calculated. As shown in FIG. 3, for the tests conducted, the pulsed ECM waveform had a rising edge anodic current pulse at a time equal to zero when phase is equal to zero. For all pulse ECM experiments the anodic duty cycle was 50% and the cathodic duty cycle was 2% with a delay of 20% from the anodic pulse, as shown in FIG. 4. A PECM positive phase shift of 90° delays voltage across the flow cell 101 by 16 μs. The ultrasonic waveform 303 is defined where a positive work piece 102 velocity reduces the IEG.

For each combination of assistance waveforms the phase difference was varied between four levels from −90° to 180° in 90° increments to determine the effect on the electrochemical cell performance. Additionally of interest were effects related to the integral of an assistance waveform like ultrasonic position or pulse voltage induced velocity which would occur at −90° and 90°, notionally thought of as maximally lagging and leading respectively.

Material removal rate (MRR) comparison was made to compare the various processes. Work pieces 102 were weighed before and after machining using a Sartorius microbalance ME36S with an ISO calibrated accuracy of 1 μg. The MRR was then calculated to be the removed mass divided by machining time as measured by the oscilloscope which was held constant at 15 seconds for all experimental runs.

The second performance metric for comparing the various processes is average surface roughness, $R_\alpha$. This performance metric is of interest for many machining or polishing operations and the most common traditional measure of roughness. Surface roughness was measured with an Alicona InfiniteFocus™ focus variation optical profiler with a vertical resolution of 0.01 μm. Scans were taken centered on the work piece 102 averaged over ten immediately adjacent profiles with a profile length of roughly 160 μm and conforming to ISO 4287.

Pulsed Electric Field and Ultrasonic Motion Sympathetic Interaction Due to Phase Difference To determine the optimal phasing for sympathetic interactions between a pulsed electric field and ultrasonic motion, the frequency of the electric field waveform 301 and the ultrasonic actuation waveform 303 were set equal. The relative phase between the two was varied in ninety degree increments and MRR and surface roughness was measured for each of these phase differences. FIG. 3A is a bar graph illustrating the relationship between material removal rate and phase difference between pulsed electronic field and ultrasonic motion, in accordance with an illustrative embodiment of the invention. FIG. 3B is a bar graph illustrating the relationship between surface roughness and phase difference between pulsed electronic field and ultrasonic motion, in accordance with an illustrative embodiment of the invention.

Figure 4A:
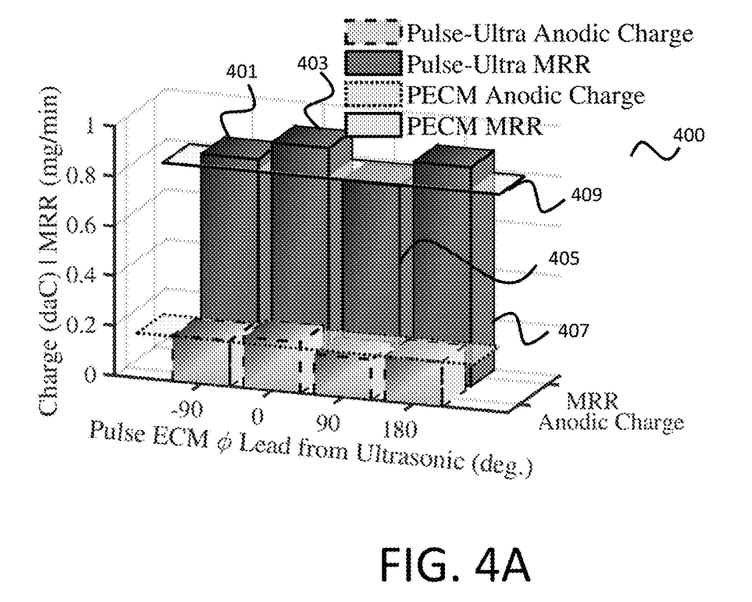
FIG. 4a is a bar graph illustrating the relationship between material removal rate and phase difference between pulsed electronic field and ultrasonic motion, in accordance with an illustrative embodiment of the invention.
Figure 5A:
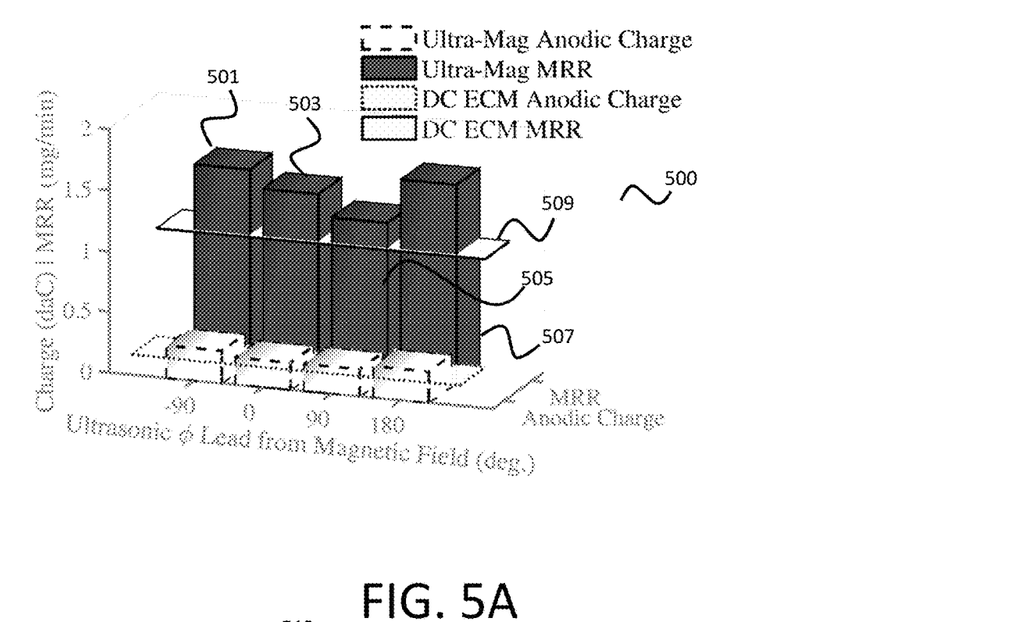
FIG. 5a is a bar graph illustrating the relationship between material removal rate and phase difference between pulsed electronic field and magnetic field, in accordance with an illustrative embodiment of the invention.
Figure 6A:
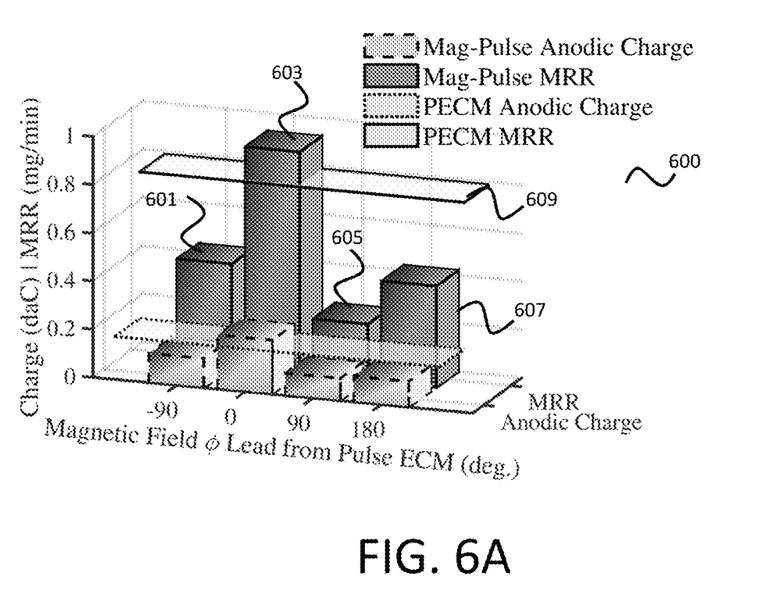
FIG. 6a is a bar graph illustrating the relationship between material removal rate and phase difference between pulsed electronic field and magnetic field, in accordance with an illustrative embodiment of the invention.

In the bar graphs shown in FIGS. 4A, 5A and 6A, the x-axis represents the relative phase lag between the coupled waveforms and the y-axis represents both the MRR as measured in mg/min and the anodic charge represented in daC. Each of the four phase lags tested (−90 degrees, 0 degrees, 90 degrees and 180 degrees) is represented by a bar showing the MRR measured for that phase lag and a bar showing the anodic charge for that phase lag. Both the baseline MRR and baseline anodic charge established with a PECM process employing a pulsed DC electric field are represented as planes intersecting the respective bars.

Figure 4B:
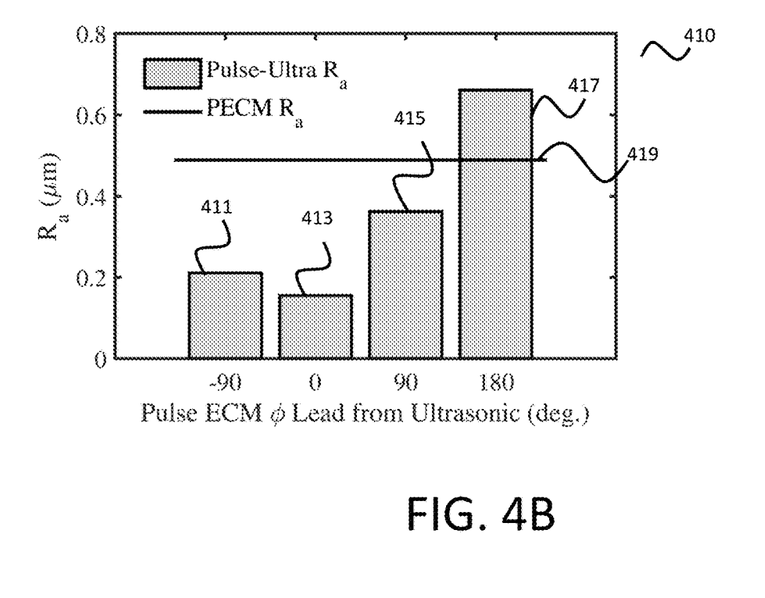
FIG. 4b is a bar graph illustrating the relationship between surface roughness and phase difference between pulsed electronic field and ultrasonic motion, in accordance with an illustrative embodiment of the invention.
Figure 5B:
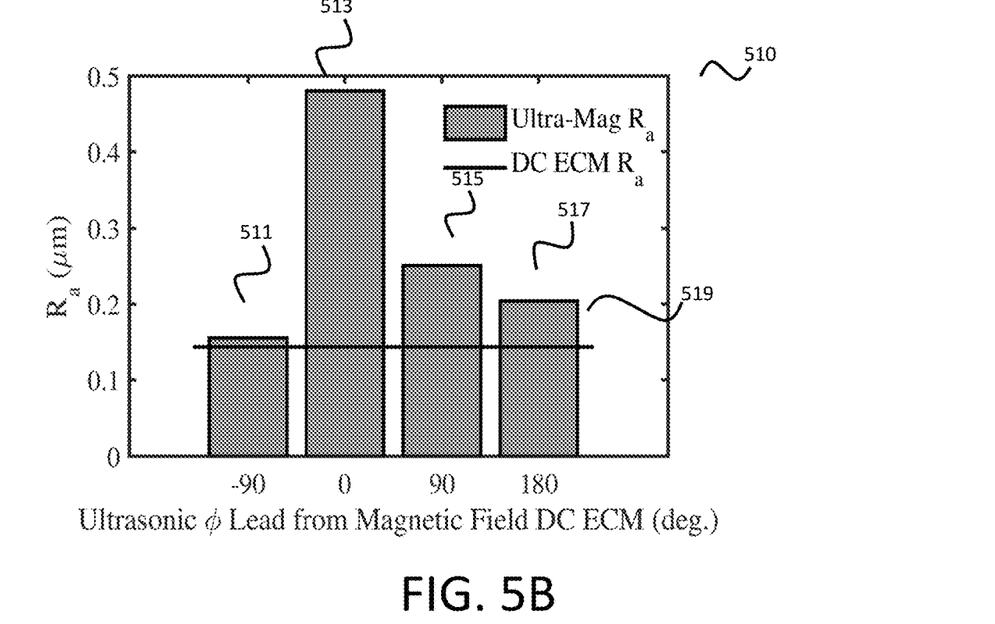
FIG. 5b is a bar graph illustrating the relationship between surface roughness and phase difference between pulsed electronic field and magnetic field, in accordance with an illustrative embodiment of the invention.
Figure 6B:
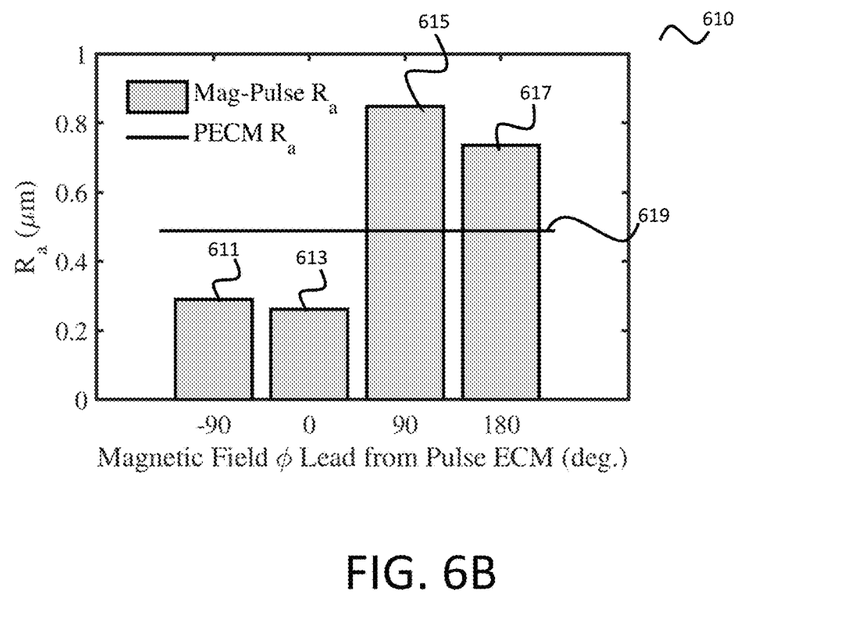
FIG. 6b is a bar graph illustrating the relationship between surface roughness and phase difference between pulsed electronic field and magnetic field, in accordance with an illustrative embodiment of the invention.

In the bar graphs shown in FIGS. 4B, 5B and 6B, the x-axis represents the relative phase lag between the coupled waveforms and the y-axis represents the average surface roughness of the finished work piece 102. Each of the four phase lags tested (−90 degrees, 0 degrees, 90 degrees and 180 degrees) is represented by a bar showing the average surface roughness of that test run. A baseline average surface roughness established with a PECM process employing a pulsed DC electric field is represented as a line intersecting the bars.

The bar plot 400 in FIG. 4A shows the measured MRR for phase lags between the electric field waveform 301 and ultrasonic waveform 303 of −90 degrees 401, 0 degrees 403, 90 degrees 405 and 180 degrees 407. Plane 409 illustrates the baseline MRR used for comparison. The bar plot 410 in FIG. 4B shows the measured surface roughness for phase lags between the electric field waveform 301 and ultrasonic waveform 303 of −90 degrees 411, 0 degrees 413, 90 degrees 415 and 180 degrees 417. Line 419 illustrates the baseline surface roughness used for comparison.

Phase between ultrasonic motion and pulsed ECM current are critical in positively effecting the material removal rate as seen in FIG. 4A where the MRR is higher or lower than the non-augmented PECM case based purely on the phasing. The MRR had a marginal increase for three of the phase leads with the best improvement of 14% at PECM phase lead of 0°. That phase lead also gave the most improvement in surface roughness for a significant decrease of 68%. This phasing is when the anodic pulse starts at the same time as the maximum gap position. The anodic pulse start is the highest current portion of the waveform because of the local charging of the electrical EDL which in this experiment coincides with minimum compression of the EDL through ultrasonic actuation. This phasing differs from standard industrial practice for PECM with a vibrating tool which typically uses a −90° phase where the minimum gap time coincides with the anodic pulse center which may be optimal at the lower frequencies typical of that industrial process. At the 0° phasing, the peak and average current are both higher than any other phase difference between the PECM and ultrasonic actuation. The loss in combined electrochemical cell resistance may be caused by better clearing of byproducts from the IEG and increased electrode kinetics at the surface caused by cavitation.

Ultrasonic Motion and Magnetic Field Interaction Sympathetic Interaction Due to Phase Difference FIG. 5a is a bar graph illustrating the relationship between material removal rate and phase difference between pulsed electronic field and magnetic field, in accordance with an illustrative embodiment of the invention. FIG. 5b is a bar graph illustrating the relationship between surface roughness and phase difference between pulsed electronic field and magnetic field, in accordance with an illustrative embodiment of the invention.

The bar plot 500 in FIG. 5A shows the measured MRR for phase lags between the electric field waveform 301 and magnetic field waveform 302 of −90 degrees 501, 0 degrees 503, 90 degrees 505 and 180 degrees 507. Plane 509 illustrates the baseline MRR used for comparison. The bar plot 510 in FIG. 5B shows the measured surface roughness for phase lags between the electric field waveform 301 and magnetic field waveform 302 of −90 degrees 511, 0 degrees 513, 90 degrees 515 and 180 degrees 517. Line 519 illustrates the baseline surface roughness used for comparison.

Combining the ultrasonic and magnetic assistive waveforms at the same frequency, regardless of phase, results in an MRR better than the DC ECM baseline, but the highest MRR occurs at 1800 seen in FIG. 5A. The sinusoidal magnetic field induces a voltage and resulting current in the work piece 102 and tool 103. The maximum positive magnetic field direction yields the maximum induced current roughly 180° out of phase with the magnetic field. The best MRR of any assisted ECM occurs at this phase lead and is also when the peak ultrasonic velocity aligns with the peak induced current. This is similar to the previous dual assisted ECM using ultrasonic actuation and PECM where pulsed anodic current is in phase with peak velocity. This phase difference also represents the minimum Lorentz force and would accelerate negatively charged ions like nitrate and others through the IEG faster with the opposite true for positive ions.

The best $R_\alpha$ occurs at a phase difference of −90° where peak induced current will align with minimum IEG and MRR is second only to the 180° phase difference case. Also of interest is that the worst surface finish occurs at a phase lead of 0°, when the Lorentz force is at a maximum slowing negative ions. The poor finish occurs despite the peak current occurring roughly at the same IEG as the 180° case.

Magnetic Field and Pulsed Electric Field Interaction Sympathetic Interaction Due to Phase Difference FIG. 6a is a bar graph illustrating the relationship between material removal rate and phase difference between pulsed electronic field and magnetic field, in accordance with an illustrative embodiment of the invention. FIG. 6b is a bar graph illustrating the relationship between surface roughness and phase difference between pulsed electronic field and magnetic field, in accordance with an illustrative embodiment of the invention.

The bar plot 600 in FIG. 6A shows the measured MRR for phase lags between the ultrasonic waveform 303 and magnetic field waveform 302 of −90 degrees 601, 0 degrees 603, 90 degrees 605 and 180 degrees 607. Plane 609 illustrates the baseline MRR used for comparison. The bar plot 610 in FIG. 6B shows the measured surface roughness for phase lags between the ultrasonic waveform 301 and magnetic field waveform 302 of −90 degrees 611, 0 degrees 613, 90 degrees 615 and 180 degrees 617. Line 619 illustrates the baseline surface roughness used for comparison.

The dual assistance using a sinusoidal magnetic field combined with PECM or Mag-Pulse has a significant increase in MRR only at 0 phase lead of the magnetic field from the PECM waveform seen in FIG. 6B. MRR increased by 17%, while any other phasing reduced MRR. The best $R_\alpha$ for this sympathetic interaction also occurs at the 0 phase difference for a surface roughness reduction of 47%. The magnetic field itself induces a current within the work piece 102 that roughly coincides with the PECM current spike associated with EDL charging. Determining the exact lag of the magnetically induced current is difficult because it is also a function of the electrochemical cell reaction. Combining the two electrical phenomena increases both the peak and RMS current.

Figure 7A:
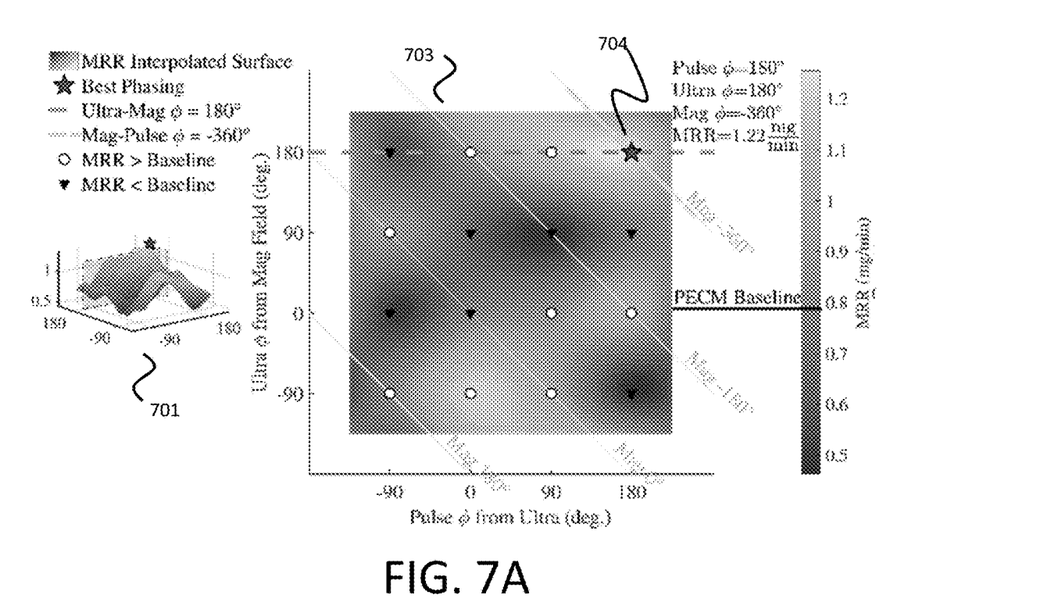
FIG. 7a is a bar graph illustrating the relationship between material removal rate and phase difference between pulsed electronic field, ultrasonic motion and magnetic field, in accordance with an illustrative embodiment of the invention.
Figure 7B:
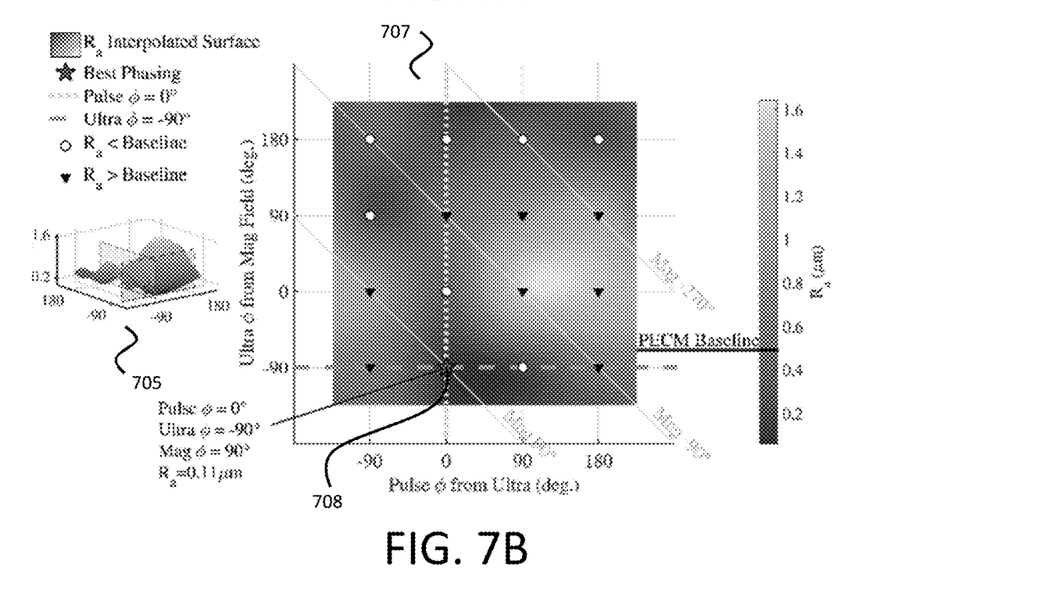
FIG. 7b is a bar graph illustrating the relationship between surface roughness and phase difference between pulsed electronic field, ultrasonic motion and magnetic field, in accordance with an illustrative embodiment of the invention.

Combined Sympathetic Interaction Between Magnetic Fields, Ultrasonic Motion and Electric Fields Due to Phase Difference FIG. 7a is a graph illustrating the relationship between material removal rate and phase difference between pulsed electronic field, ultrasonic motion and magnetic field, in accordance with an illustrative embodiment of the invention. FIG. 7b is a graph illustrating the relationship between surface roughness and phase difference between pulsed electronic field, ultrasonic motion and magnetic field, in accordance with an illustrative embodiment of the invention.

Using electric and magnetic fields combined with ultrasonic actuation all with sympathetic phasing between the waveforms produced a triad assisted ECM. Ions in solution are controlled to positively affect the MRR by increasing the current flow through changes in the machining gap, induced voltages and increased reaction kinetics at the machining surface.

FIG. 7a shows the MRR for sixteen experimental runs encompassing all waveform phase difference combinations. Plot 701 shows a three dimensional representation of the measured MRR and plot 703 provides a two dimensional plot of the phase differences with MRR illustrated by tone. The scale of MRR values by tone is shown to the right of the plot 703. The waveform phase difference combinations are represented by open circles or triangles, with triangles indicating an MRR below baseline and circles indicating an MRR above baseline.

FIG. 7b shows the $R_\alpha$ response for sixteen experimental runs encompassing all waveform phase difference combinations. Plot 705 shows a three dimensional representation of the measured $R_\alpha$ and plot 707 provides a two dimensional plot of the phase differences with $R_\alpha$ illustrated by tone. The scale of $R_\alpha$ values by tone is shown to the right of the plot 707. The waveform phase difference combinations are represented by open circles or triangles, with triangles indicating an MRR below baseline and circles indicating an MRR above baseline.

The response surfaces are interpolated between these sixteen points to better illustrate the interrelations through surface curvature and the end constraints are consistent with the previously stated cyclic nature of sinusoids, so these surfaces will tessellate with themselves as expected. An additional set of grid lines running diagonally between the ultrasonic and PECM phase lead axes to show the phase lead of the magnetic waveform form the PECM. Phase difference between the three waveforms only has two degrees of freedom so any single phase difference can be calculated from the other two.

The MRR surface for triad assisted ECM in FIG. 7a indicates the best phasing for MRR which is at the intersection of the 180 ultrasonic and −360 magnetic phase lead planes for an increase of 55% over the PECM baseline, as represented by star 704. A 180 phase lead of ultrasonic velocity from the magnetic field waveform is presented by the plane labeled "Ultra o" which also corresponds to the dual assisted phase lead with highest MRR. The vertical plane representing the magnetic field phase lead from the PeCM waveform at −360 or equally 0 coincides with the highest MRR for that dual interaction. The Ultra-Mag and Mag-Pulse dual assisted ECM combinations had the highest MRR. Of particular interest is that this phasing of the triad assisted ECM has a higher MRR than the DC ECM baseline despite the triad assisted only has 50% of the anodic duty cycle of the DC case. The best MRR point also shows a 52% improvement in $R_\alpha$.

Surface roughness performance is shown in the response surface in FIG. 7b with $R_\alpha$ on the Z-axis. The phasing that produces the best surface finish, as represented by star 708 is different from best MRR phasing previously discussed. The plane at 0 PECM lead and at −90 ultrasonic phase lead intersect at the best $R_\alpha$ point where the $R_\alpha$ is reduced by 78% compared to the PECM baseline. The two dual assisted experimental runs with the best surface roughness each lie on the −90 plane for the Ultra-Mage phase lead and 0 Pulse-Ultra phase lead with the latter being slightly better. An added benefit of this phasing is that with an MRR increase of 52% it is nearly as good as the best triad MRR of 55%.

CONCLUSION

Combining all three assistive waveforms at a specific phasing yields the best $R_\alpha$ of any assisted ECM or PECM with a 78% improvement compared to the PECM baseline and even 26% better than DC ECM. MRR improved 55% over PECM and even 15% beyond DC ECM despite only a 50% anodic duty cycle. The best combined performance occurred at the phasing of Pulse-Ultra at 0° and Ultra-Mag at −90°, this triad assisted ECM has the best surface quality, but not have the highest peak or average current while still improving MRR by 52%. This specific phasing raised current at the end of the anodic pulse higher than initial spike associated with EDL charging that starts the anodic pulse. This is caused from combining the magnetically induced current peak with the minimum IEG timed with the PECM anodic pulse end.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description but by the claims and any equivalents.

While the above study addresses controlling phase differences between waveforms, it should be appreciated that sympathetic interactions may be increased or exploited by varying one or more other factors of the driving waveforms. These factors include but are not limited to waveform amplitude, frequency and orientation. For example, in the study described above, the frequency and amplitudes of the waveforms were tuned to effect nitrate. However, the amplitude and frequency of the waveforms may be selected to target other materials within the electrolytic cell such as aluminum.

What is claimed is:

1. An electrochemical machining technique comprising: interposing an electrolyte solution comprising ions through an interelectrode gap wherein the surface of a metallic work piece and an electrically conductive tool is exposed to the electrolyte solution in the interelectrode gap,
generating a Lorentz force on the ions in the electrolyte solution by simultaneously applying an electric field defined by bi-polar pulsed electric field waveform across the interelectrode gap, an external magnetic field defined by a magnetic field waveform to the electrolyte solution, and a relative ultrasonic actuation defined by an ultrasonic velocity waveform to the electrically conductive tool wherein at least two of the bi-polar pulsed electric field waveform, the magnetic field waveform and the ultrasonic velocity waveform are coupled in a predetermined sympathetic interaction to influence the Lorentz force on the ions.

2. The technique of claim 1 wherein at least two of the bi-polar pulsed electric field waveform, the magnetic field waveform and the ultrasonic velocity waveform have the same frequency.

3. The technique of claim 2 wherein at least two of the bi-polar pulsed electric field waveform, the magnetic field waveform and the ultrasonic velocity waveform are coupled by having a predetermined phase difference.

4. The technique of claim 3 wherein the bi-polar pulsed electric field waveform and the ultrasonic velocity waveform are coupled in a predetermined sympathetic interaction to influence the Lorentz force on the ions.

5. The technique of claim 4 further comprising the step of lagging the ultrasonic velocity waveform from the bi-polar pulsed electric field waveform by a predetermined phase.

6. The technique of claim 5 wherein the predetermined phase is 0 degrees.

7. The technique of claim 1 wherein the bi-polar pulsed electric field waveform comprises an anodic duty cycle of approximately 50% and a cathodic duty cycle of approximately 2% wherein the cathodic pulse is delayed approximately 20% from the anodic pulse.

8. The technique of claim 1 wherein a 90 degree shift in the phase of the bi-polar pulsed electric field waveform delays voltage across the electrolytic cell 16 microseconds.

9. The technique of claim 3 wherein the bi-polar pulsed electric field waveform and the magnetic field waveform are coupled in a predetermined sympathetic interaction to influence the Lorentz force on the ions.

10. The technique of claim 8 further comprising the step of lagging the magnetic field waveform from the bi-polar pulsed electric field waveform by a predetermined phase.

11. The technique of claim 9 wherein the predetermined phase is selected from the group consisting of: −90 degrees.

12. The technique of claim 3 wherein the magnetic field waveform and the ultrasonic velocity waveform are coupled in a predetermined sympathetic interaction to influence the Lorentz force on the ions and wherein the magnetic field is applied parallel to the work piece.

13. The technique of claim 4 further comprising the step of lagging the magnetic field waveform from the ultrasonic velocity waveform by a predetermined phase.

14. The technique of claim 12 wherein the predetermined phase is 0 degrees.

15. The technique of claim 3 wherein the bi-polar pulsed electric field waveform, the magnetic field waveform and the ultrasonic velocity waveform are coupled in a predetermined sympathetic interaction.

16. An electrochemical machining technique comprising: interposing an electrolyte solution comprising ions through an interelectrode gap wherein the surface of a metallic work piece and an electrically conductive tool is exposed to the electrolyte solution in the interelectrode gap,
generating a force on the ions in the electrolyte solution by simultaneously applying an electric field defined by a bi-polar pulsed electric field waveform across the interelectrode gap, an external magnetic field defined by a magnetic field waveform to the electrolyte solution, and a relative ultrasonic actuation defined by an ultrasonic velocity waveform to the electrically conductive tool wherein the bi-polar pulsed electric field waveform, the magnetic field waveform and the ultrasonic velocity waveform are coupled in a predetermined sympathetic interaction by having a common frequency and a predetermined relative phase difference.

17. The technique of claim 16 wherein the predetermined phase is selected from the group consisting of: −90 degrees, 0 degrees, 90 degrees and 180 degrees.

18. The technique of claim 9 wherein the bi-polar pulsed electric field waveform comprises an anodic duty cycle of approximately 50% and a cathodic duty cycle of approximately 2% wherein the cathodic pulse is delayed approximately 20% from the anodic pulse.

* * * * *